H. H. NIEMAN.
DUST PROOF FILTERING CUP COVER.
APPLICATION FILED JUNE 12, 1913.

1,120,229. Patented Dec. 8, 1914.

Witnesses:
John J. Kittel
Teresa T. Lynch

Inventor
Howard H. Nieman
By his Attorney
Howard Nieman

UNITED STATES PATENT OFFICE.

HOWARD H. NIEMAN, OF NEW YORK, N. Y.

DUST-PROOF FILTERING CUP-COVER.

1,120,229. Specification of Letters Patent. Patented Dec. 8, 1914.

Application filed June 12, 1913. Serial No. 773,152.

*To all whom it may concern:*

Be it known that I, HOWARD H. NIEMAN, a citizen of the United States, and residing in the city of New York, borough of Manhattan, county and State of New York, have invented certain new and useful Improvements in Dust-Proof Filtering Cup-Covers, of which the following is a full, clear, and exact specification.

My invention consists of a hygienic dust-proof filtering cover or lid for liquid retaining receptacles, whereby injurious and objectionable matters may be prevented from entering the receptacle when not in use, and which further acts as a filtering means for liquids which it is desired to introduce into the vessel.

The hygienic advantages of individual drinking cups are so thoroughly recognized that the adoption of collapsible cups has become very general, especially with the traveling public. They possess the disadvantage, however, of becoming contaminated with dust and dirt when not in use, and they contain no prevention against the use of drinking matter containing objectionable ingredients which are capable of removal by filtration.

My invention overcomes these objectionable and disadvantageous features and presents a means whereby the cup can be easily and cheaply converted into a liquid receptacle that is always clean and in which the liquid has been subjected to a filtering operation.

It consists generally of a lid or cover capable of placement upon a liquid holding receptacle and possessing a filtering means through which the liquid may be introduced into the receptacle, and which further acts as a means for preventing the accidental introduction of dust or other objectionable matters into the receptacle when it is not in use. The device therefore serves the double hygienic value of a filter and a preventative of contamination.

Two forms of my invention are disclosed in the accompanying drawings, in which similar parts are designated by corresponding letters.

Figure 1:
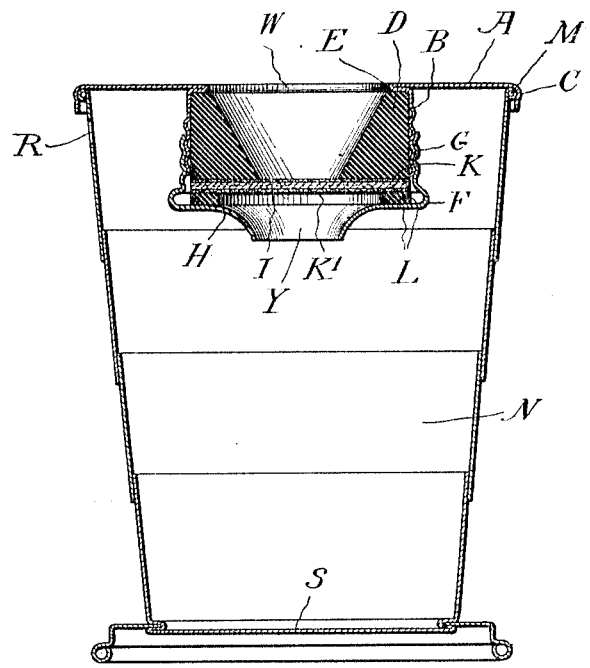
Figure 2:
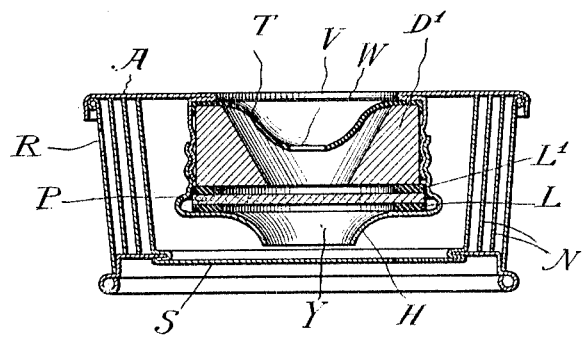

Figure 1 represents a cross-section of one form of my invention applied to an extended collapsible cup. Fig. 2 represents a cross-section of one form of my invention as applied to a closed collapsible cup.

In the drawings the device is shown in a form in which the outer casing is composed of two parts holding the inner elements in their respective positions. The shell or casing consists of an upper and a lower element. The upper element comprises a circular top plate A, being perforated by a centrally located opening W, the disk being extended downwardly and slightly inwardly at its outer edge C in order to separably grip or hold the upper edge or bead M of the collapsible cup N. The inner edge of the top plate A is lapped under itself at E and then extended downwardly with a threaded surface at B. The lower element comprises a cylindrical member H perforated with a centrally located opening Y, the member H being extended upwardly and outwardly at F and being continued into the threaded surface G. The threads B and G are so gaged as to mesh when revolved, forming a tight joint.

D is a rubber disk having a central cone-shaped opening, the disk possessing a size and shape that will allow of its being fitted snugly between the surfaces of A and B and extending slightly below the lower extremity of B. The filtering fabric I is retained between the two metallic gauzes K and K'. The rubber washer L is ring-shaped and has a centally located opening. When the various elements are placed in their respective positions, they are forced upon each other by screwing the lower casing member up upon the upper casing member, thus forming a water-proof receptacle, allowing the water to flow only through the opening W, the gauzes, and the filtering fabric, into the liquid containing receptacle below. When a greater filtering surface is desired, an additional rubber washer may be placed between the metallic gauze K and the member D, as indicated in Fig. 2.

In Fig. 2, the disk D' is composed of a non-resilient material, such as wood. In order to produce a connecting tight joint between the liquid faucet and the device, a circular fabric T, preferably of rubber, having a centrally located opening V is placed between the lower surface of A and the disk D' and held in place by the pressure of D' against A when the two casing elements are screwed tightly together. The filtering material P in Fig. 2 consists of a filter-stone held between the two rubber disks or washers L and L'. R is an opening in the side of the cup N in order to indicate when the receptacle is full. By having the height of the device less than the inside height of the collapsible cup when closed, it can be retained upon the cup and thus acts as a hygienic means for preventing the accumulation of dust or impurities within the cup when not in use.

When using the device of my invention it is placed upon a liquid holding receptacle and the liquid faucet is passed through the opening in the top plate and pressed firmly upon the upper disk member, producing a practically water tight joint. When the liquid is allowed to flow, it passes downwardly through the filtering material and through the opening in the bottom member into the receptacle. When the receptacle holds sufficient liquid the device may be removed and the liquid used.

It is evident that my invention is not limited to a collapsible cup, to the particular filtering mediums or the particular size, shape or arrangement of the elements as shown in the drawings; the essence of my invention being a cap or cover for a liquid holding receptacle possessing a filtering means and capable of producing a practically dust-proof receptacle.

What I claim is:

1. A filter including a top plate of greater diameter than the rest of the filter with an opening, an internally conical shaped resilient means in alinement with the top plate opening for producing a practically water-tight joint with a faucet when introduced through said opening and pressed upon said conical resilient means, a filtering medium situated below the conical shaped resilient element, a bottom member with an opening in alinement with the top plate opening, and means for producing a water-tight seal around the liquid passage between the two openings.

2. A filter including a perforated top plate extending outwardly, an interiorly conical resilient means below the top plate perforation and in alinement therewith for producing a practically water-tight connection with a faucet, a filtering medium situated below the conical shaped resilient element and retained in close adjustment between two perforated resilient members, a water-tight seal around the liquid channel being obtained by the upward pressure of a perforated bottom member.

3. A filter including a cover comprising a top plate with a centrally located opening and extending outwardly beyond the other elements of the filter, the inner portion of the top plate extending downwardly, then outwardly to form an abutment, and further extending downwardly with a threaded surface, a resilient disk with an inverted cone-shaped opening situated below and in alinement with the opening of the top plate, the greater diameter of the opening of the cone-shaped element corresponding approximately with the diameter of the top plate opening, a filtering medium at least as large as the smaller opening of the cone and extending across said opening, a resilient washer between the filtering medium and a bottom with a centrally located opening in alinement with the conical shaped opening of the resilient disk, the bottom member extending outwardly and upwardly with a threaded surface to mesh with the threaded top plate to form a water-tight seal around the passage formed by the openings and the filtering medium, the height of the device being such as to allow its retention within a collapsed cup.

Signed at the borough of Manhattan, city, county and State of New York, this 6th day of June, 1913.

HOWARD H. NIEMAN.

Witnesses:
C. W. DONOHUE,
A. A. KELLEY.